(12) United States Patent
Kawakita

(10) Patent No.: US 10,243,178 B2
(45) Date of Patent: Mar. 26, 2019

(54) PACKAGING MATERIAL FOR POWER STORAGE DEVICE, AND POWER STORAGE DEVICE

(71) Applicant: SHOWA DENKO PACKAGING CO., LTD., Kanagawa (JP)

(72) Inventor: Keitaro Kawakita, Kanagawa (JP)

(73) Assignee: SHOWA DENKO PACKAGING CO., LTD., Kanagawa (JP)

(*) Notice: Subject to any disclaimer, the term of this patent is extended or adjusted under 35 U.S.C. 154(b) by 23 days.

(21) Appl. No.: 15/447,591

(22) Filed: Mar. 2, 2017

(65) Prior Publication Data

US 2017/0256758 A1 Sep. 7, 2017

(30) Foreign Application Priority Data

Mar. 2, 2016 (JP) .................................. 2016-40083

(51) Int. Cl.
*H01M 2/02* (2006.01)
*H01G 11/82* (2013.01)
*H01G 11/80* (2013.01)

(52) U.S. Cl.
CPC .......... *H01M 2/0287* (2013.01); *H01G 11/80* (2013.01); *H01G 11/82* (2013.01); *H01M 2/02* (2013.01); *H01M 2/0207* (2013.01); *H01M 2/0237* (2013.01); *H01M 2/0257* (2013.01); *H01M 2/0267* (2013.01); *H01M 2/0272* (2013.01); *H01M 2/0275* (2013.01); *H01M 2/0277* (2013.01); *H01M 2/0285* (2013.01);

(Continued)

(58) Field of Classification Search
None
See application file for complete search history.

(56) References Cited

U.S. PATENT DOCUMENTS

2014/0356655 A1* 12/2014 Yoshino .............. H01M 2/0287
429/53
2015/0171406 A1* 6/2015 Bazzarella .......... H01M 2/0287
429/120

(Continued)

FOREIGN PATENT DOCUMENTS

JP 2005022336 A 1/2005

OTHER PUBLICATIONS

English Abstract of JP2005022336, Publication Date: Jan. 27, 2005.

*Primary Examiner* — Scott J. Chmielecki
(74) *Attorney, Agent, or Firm* — Millen, White, Zelano & Branigan, P.C.; William Nixon

(57) ABSTRACT

A packaging material 1 for a power storage device is configured to include a polyamide resin layer 2 as an outer layer, a polyolefin resin layer 3 as an inner layer, and an aluminum foil layer 4 arranged between both the layers. A thickness of the packaging material 1 for a power storage device is 90 μm or less, a tensile breaking strength of the packaging material for a power storage device is 110 N/15 mm width or more, and a tensile breaking elongation of the packaging material for a power storage device is 90% or more. This enables to provide a packaging material for a power storage device thin in thickness and light in weight which is capable of securing excellent formability even when deep shape forming is performed and also is high in mechanical strength and excellent in impact resistance.

7 Claims, 3 Drawing Sheets

(52) U.S. Cl.
CPC .. *H01M 2/0292* (2013.01); *H01M 2002/0297* (2013.01); *Y02E 60/13* (2013.01)

(56) References Cited

U.S. PATENT DOCUMENTS

2015/0325822 A1* 11/2015 Ichikawa ............ H01M 2/0275
    429/185
2016/0036013 A1* 2/2016 Nakazato ............ H01M 2/0287
    429/181

* cited by examiner

PACKAGING MATERIAL FOR POWER STORAGE DEVICE, AND POWER STORAGE DEVICE

CROSS-REFERENCE TO THE RELATED APPLICATIONS

The present application claims priority to Japanese Patent Application No. 2016-40083 filed on Mar. 2, 2016, the entire disclosure of which is incorporated herein by reference in its entirety.

BACKGROUND OF THE INVENTION

Field of the Invention

The present invention relates to a packaging material for a power storage device, such as, e.g., a capacitor or a battery used for a mobile device such as a smartphone and a tablet, and a battery or a capacitor used to store electricity for a hybrid vehicle, an electric vehicle, a wind power generation system, a solar power generation system, and a nighttime electricity storage. It also relates to a power storage device packaged by the packaging material.

The following description of related art sets forth the inventors' knowledge of related art and certain problems therein and should not be construed as an admission of knowledge in the prior art.

In claims and the specification of this application, the term "tensile breaking strength" means a tensile breaking strength of a type 2 test piece (sample width of 15 mm) measured under the conditions of a distance between grippers of 100 mm, an inter-gauge line distance of 50 mm, a tensile speed of 100 mm/min in accordance with JIS K 7127-1999 (Test method of tensile properties Part 3).

Further, in claims and the specification of this application, the term "tensile breaking elongation" means a tensile breaking elongation of a type 2 test piece (sample width of 15 mm) measured under the conditions of a distance between grippers of 100 mm, an inter-gauge line distance of 50 mm, a tensile speed of 100 mm/min in accordance with JIS K 7127-1999 (Test method of tensile properties Part 3).

Further, in claims and the specification of this application, the term "fracture strain energy" means a fracture strain energy (energy per unit volume) of a type 2 test piece (sample width of 15 mm) obtained by calculating the area under a curve (a curve from the start of tension to the breakage) in a tensile stress-strain curve diagram obtained by measuring under the conditions of a distance between grippers of 100 mm, an inter-gauge line distance of 50 mm, a tensile speed of 100 mm/min in accordance with JIS K 7127-1999 (Test method of tensile properties Part 3) fracture strain energy (energy per unit volume).

Further, in claims and the specification of the present application, the term "aluminum" is used to include the meaning of aluminum and its alloys.

In recent years, with the thinning and weight saving of a mobile electrical equipment, such as, e.g., a smartphone and a tablet terminal, as a packaging material for a power storage device, such as, e.g., a lithium-ion secondary battery, a lithium polymer secondary battery, a lithium-ion capacitor, and electric double layer capacitor to be installed in such power storage device, in place of a traditional metal can, a laminate of a heat resistant resin layer/an adhesive layer/a metal foil layer/an adhesive layer/a thermoplastic resin layer is used (See Patent Document 1: Japanese Unexamined Patent Application Publication No. 2005-22336). Normally, bulging and deep drawing are performed on the laminate, so that the laminate is formed into a three-dimensional shape, such as, e.g., a substantially rectangular parallelepiped shape. Furthermore, a power source for an electric vehicle, etc., a large-sized power source for a storage application, a capacitors and the like are getting popular to be packaged with the laminate (packaging material) having the aforementioned structure.

In the meantime, in recent years, further thinning and weight saving are being promoted for the above-mentioned mobile electrical equipment, etc. Also as a power storage device to be installed in such mobile electrical equipment, thinning and weight saving are also required. In response to such requirement, development is being progressed to attain thinning and weight saving of a packaging material for a power storage device.

In order to meet the requirements of thinning and weight saving, when the thickness of the packaging material is designed to be thin, there is a problem that cracks, etc., occur at the time of forming, such as bulging and deep drawing, when deep forming is performed. Therefore, good forming can be performed only when performing shallow forming.

The description herein of advantages and disadvantages of various features, embodiments, methods, and apparatus disclosed in other publications is in no way intended to limit the present invention. For example, certain features of the preferred described embodiments of the invention may be capable of overcoming certain disadvantages and/or providing certain advantages, such as, e.g., disadvantages and/or advantages discussed herein, while retaining some or all of the features, embodiments, methods, and apparatus disclosed therein.

SUMMARY OF THE INVENTION

The disclosed embodiments of this disclosure have been developed in view of the above-mentioned and/or other problems in the related art. The disclosed embodiments of this disclosure can significantly improve upon existing methods and/or apparatuses.

The present invention was made in view of the aforementioned technical background, and aims to provide a packaging material for a power storage device which is thin in thickness and light in weight and is capable of securing excellent formability even when deep shape forming is performed and also is high in mechanical strength and excellent in impact resistance.

In order to attain the aforementioned objects, the present invention provides the following means.

[1] According to a first aspect of the present invention, a packaging material for a power storage device includes a polyamide resin layer as an outer layer, a polyolefin resin layer as an inner layer, and an aluminum foil layer arranged between the outer layer and the inner layer. A thickness of the packaging material for a power storage device is 90 μm or less, a tensile breaking strength of the packaging material for a power storage device is 110 N/15 mm width or more, and a tensile breaking elongation of the packaging material for a power storage device is 90% or more.

[2] In the packaging material for a power storage device as recited in the aforementioned item [1], it may be configured such that when a thickness of the polyamide resin layer is "X", and a thickness of the aluminum foil layer is "Y", a relational expression of $(X/Y) \geq 0.6$ is satisfied.

[3] In the packaging material for a power storage device as recited in the aforementioned item [1] or [2], it may be configured such that a fracture strain energy obtained from a tensile stress-strain curve obtained by a tensile test of the packaging material for a power storage device is 60 MJ/m$^3$ or more.

[4] In the packaging material for a power storage device as recited in any one of the aforementioned items [1] to [3], it may be configured such that when a thickness of the aluminum foil layer is "Y" and a thickness of the polyolefin resin layer is "V", a relational expression of (Y/V)≥0.6 is satisfied.

[5] In the packaging material for a power storage device as recited in any one of the aforementioned items [1] to [4], it may be configured such that a thickness of the polyamide resin layer is 20 μm to 40 μm, a thickness of the aluminum foil layer is 20 μm to 25 μm, and a thickness of the polyolefin resin layer is 15 μm to 30 μm.

[6] According to a second aspect of the present invention, a power storage device includes a power storage device main body, and the packaging material for a power storage device as recited in any one of the aforementioned items [1] to [5]. The power storage device main body is packaged with the packaging material.

According to the invention as recited in the aforementioned item [1], the tensile breaking strength of the packaging material for a power storage device is 110 N/15 mm width or more, and the tensile breaking elongation of the packaging material for a power storage device is 90% or more. Therefore, even if the thickness of the packaging material is 90 μm or less, a packaging material for a power storage device which is capable of securing excellent formability even when deep shape forming is performed and also is high in mechanical strength and excellent in impact resistance can be provided.

According to the invention as recited in the aforementioned item [2], since it is configured to satisfy the relational expression of (X/Y)≥0.6, when the thickness of the polyamide resin layer is "X" and the thickness of the aluminum foil layer is "Y", excellent formability can be secured even if deeper drawing is performed, and impact resistance can be improved.

According to the invention as recited in the aforementioned item [3], since it is configured such that the tensile breaking strength of the packaging material for a power storage device is 60 MJ/m$^3$ or more, excellent formability can be secured even if deeper drawing is performed, and impact resistance can be improved.

According to the invention as recited in the aforementioned item [4], since it is configured such that the relational expression of (Y/V)≥0.6 is satisfied when a thickness of the aluminum foil layer is "Y" and a thickness of the polyolefin resin layer is "V", excellent formability can be secured even if deeper drawing is performed, the high mechanical strength can be attained, which can improve the impact resistance.

In the invention (power storage device) as recited in the aforementioned item [5], although it is configured to design such that the packaging material is thin in thickness, it is possible to provide a power storage device packaged by a packaging material which is capable of securing excellent formability even when deep shape forming is performed and also is high in mechanical strength and excellent in impact resistance.

BRIEF DESCRIPTION OF THE DRAWINGS

Embodiments of the present invention are shown by way of example, and not limitation, in the accompanying figures.

EMBODIMENT FOR CARRYING OUT THE INVENTION

Figure 1:
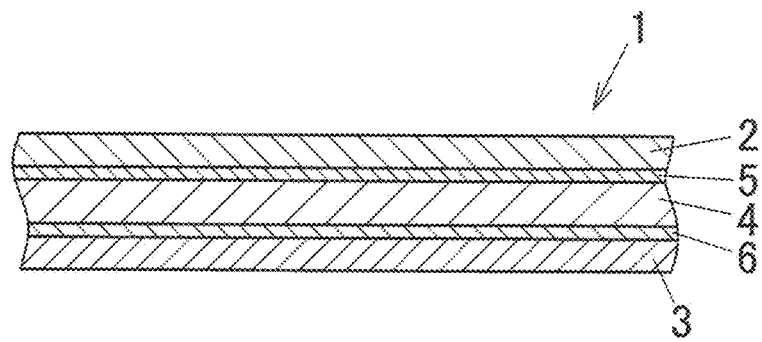
FIG. 1 is a cross-sectional view showing one embodiment of a packaging material for a power storage device according to the present invention.

One embodiment of a packaging material for a power storage device according to the present invention is shown in FIG. 1. This packaging material 1 for a power storage device is used for a lithium-ion secondary battery case. That is, the packaging material 1 for a power storage device is subjected to shaping, such as, e.g., deep drawing and bulging, and used as a case, etc., of a secondary battery.

The packaging material 1 for a power storage device shown in FIG. 1 is configured such that a polyamide resin layer (outer layer) 2 is integrally laminated on one surface of the aluminum foil layer 4 via a first adhesive layer 5, and that a polyolefin resin layer (inner layer) 3 is integrally laminated on the other surface of the aluminum foil layer 4 via a second adhesive layer 6.

The packaging material 1 for a power storage device according to the present invention is configured such that the thickness (total thickness) of the packaging material 1 for a power storage device is 90 μm or less, the tensile breaking strength of the packaging material for a power storage device is 110 N/15 mm width or more, and the tensile breaking elongation of the packaging material for a power storage device is 90% or more.

According to the present invention, since the tensile breaking strength of the packaging material for a power storage device is 110 N/15 mm width or more and the tensile breaking elongation of the packaging material is 90% or more, it is possible to provide a packaging material for a power storage device which can secure excellent formability even when deep molding is performed even if the thickness of the packaging material is designed to be 90 μm or less and is high in mechanical strength and excellent in impact resistance.

The tensile breaking strength of the packaging material for a power storage device is preferably "115 N/15 mm width" or more, more preferably "120 N/15 mm width" or more. Among other things, the tensile breaking strength of the packaging material for a power storage device is particularly preferably within the range of 120 N/15 mm width to 180 N/15 mm width.

The tensile breaking elongation of the packaging material for a power storage device is preferably 120% or more, more preferably 120% to 200%.

In the present invention, it is preferable that the relational expressions of $(X/Y) \geq 0.6$ be established, when the thickness of the polyamide resin layer 2 is "X" and the thickness of the aluminum foil layer 4 is "Y". In this case, excellent formability can be secured even if deeper drawing is performed, and impact resistance can be improved. Among other things, it is more preferable that the relational expression of (X/Y)≥0.8 be established, particularly preferable that the relational expression of (X/Y)≥1.0 be established.

Further, it is preferable that the relational expressions of (Y/V)≥0.6 be established,
when the thickness of the aluminum foil layer 4 is "Y" and the thickness of the polyolefin resin layer 3 is "V". In this case, excellent formability can be secured even if deeper drawing is performed, the high mechanical strength can be attained, which can improve the impact resistance. Among other things, it is more preferable that the relational expression of (Y/V)≥0.8 be established, particularly preferable that the relational expression of (Y/V)≥1.0 be established.

It is also preferable that the relational expression satisfying X≥Y≥V be established. In this case, excellent formability can be secured even if more deeper drawing is performed.

Further, it is preferable that the fracture strain energy obtained from the tensile stress-strain curve obtained by the tensile test of the packaging material for a power storage device be 60 MJ (mega joules)/m$^3$ or more. In this case, even if deeper shaping is performed, excellent formability can be secured, and impact resistance can be improved.

In the present invention, as the polyamide resin layer (outer layer) 2, although not particularly limited, for example, a polyamide film, such as, e.g., a nylon film, can be exemplified, and these stretched films are preferably used. Among other things, as the polyamide resin layer (outer layer) 2, a biaxially stretched polyamide film, such as, e.g., a biaxially stretched nylon film, is preferably used. Furthermore, it is particularly preferable to use a simultaneous biaxially stretched polyamide film, such as, e.g., a simultaneous biaxially stretched nylon film. The nylon film is not particularly limited, but examples thereof include a 6 nylon film, a 6, 6 nylon film, an MXD nylon film, and the like.

The thickness of the polyamide resin layer 2 is preferably set to 15 μm to 40 μm. Among other things, the thickness of the polyamide resin layer 2 is more preferably set to 20 μm to 40 μm.

The hot water shrinkage percentage of the polyamide film used for the polyamide resin layer 2 is preferably 2.5% to 10%. In this case, an effect that it is possible to perform deeper shaping can be exerted. Further, it is preferable to use a biaxially stretched polyamide film in which a ratio (MD/TD) of the "hot water shrinkage percentage in the M direction" to the "hot water shrinkage percentage in the T direction" is within the range of 0.8 to 1.2. In the case of adopting the configuration in which the ratio (MD/TD) is within the range of 0.8 to 1.2, a packaging material with particularly good formability can be obtained. It should be noted that the "M direction" means a "machine flow direction" and the "T direction" means a "direction orthogonal to the M direction (machine flow direction)". Hereinafter, the same is also applied.

The "hot water shrinkage percentage" is a dimensional change rate of a test piece (10 cm×10 cm) of a stretched polyamide resin film in the stretching direction before and after immersion of the test piece in 95° C. hot water for 30 minutes, and can be obtained by the following equation.

Hot water shrinkage percentage (%)={(E−F)/E}×100

E: Dimension in the stretching direction before the immersion treatment

F: Dimension in the stretching direction after the immersion treatment

The hot water shrinkage percentage in case of adopting a biaxially stretched film is an average value of the dimensional change rate in the two stretching directions.

The hot water shrinkage percentage of the stretched polyamide resin film can be controlled by adjusting, for example, the heat setting temperature during the stretching.

The tensile breaking strength of the polyamide film used for the polyamide resin layer 2 is preferably 50 N/15 mm width or more, more preferably 60 N/15 mm width or more, particularly preferably 90 N/15 mm width or more. Further, the "tensile breaking strength of the polyamide film in the M direction"/"tensile breaking strength of the polyamide film in the T direction" is preferably in the range of 0.8 to 1.2. In this case, an effect of capable of performing deeper shaping can be exerted.

The tensile breaking elongation of the polyamide film used for the polyamide resin layer 2 is preferably 70% or more, more preferably 80% or more, particularly preferably 120% or more. Further, the "tensile breaking elongation of the polyamide film in the M direction"/"tensile breaking elongation of the polyamide film in the T direction" is preferably in the range of 0.8 to 1.2. In this case, it is high mechanical strength, and an effect capable of performing deeper shaping can be exerted.

The aluminum foil layer 4 plays a role of imparting a gas barrier property that prevents penetration of oxygen and moisture into the packaging material 1. The material of the aluminum foil layer 4 is preferably an Al—Fe series annealed material. The thickness of the aluminum foil layer 4 is preferably 10 μm to 35 μm, more preferably 15 μm to 35 μm.

The aluminum foil layer 4 is preferably subjected to a chemical conversion treatment at least on the inner surface (the surface on the second adhesive layer 6 side: the surface on the polyolefin resin layer 3 side). By being subjected to such chemical conversion treatment, corrosion of the surface of the metal foil due to contents (electrolyte of a battery, etc.) can be prevented sufficiently. For example, by performing the following treatment, chemical conversion treatment is subjected to the metal foil. That is, a chemical conversion treatment is performed by, for example, applying any one of the following 1) to 3) aqueous solutions on the surface of the metal foil subjected to a degreasing treatment, and then drying it:

1) an aqueous solution of a mixture containing
    phosphoric acid,
    chromic acid, and
    at least one compound selected from the group consisting of a fluoride metal salt and a fluoride non-metal salt,
2) an aqueous solution of a mixture containing
    a phosphoric acid,
    at least one resin selected from the group consisting of an acryl-based resin, a chitosan derivative resin, and a phenol-based resin, and
    at least one compound selected from the group consisting of a chromic acid and a chromium (III) salt,
3) an aqueous solution of a mixture containing
    a phosphoric acid,
    at least one resin selected from the group consisting of an acryl-based resin, a chitosan derivative resin, and a phenol-based resin,
    at least one compound selected from the group consisting of a chromic acid and a chromium (III) salt, and at least one compound selected from the group consisting of a fluoride metal salt and a fluoride non-metal salt.

The chemical conversion coating is preferably 0.1 mg/m$^2$ to 50 mg/m$^2$ as a chromium adhesion amount (per one side), especially preferably 2 mg/m$^2$ to 20 mg/m$^2$.

The polyolefin resin layer (inner layer) 3 plays a role of imparting an excellent chemical resistance against a highly corrosive electrolyte used in a lithium-ion secondary battery and the like and also imparting a heat sealing property to the packaging material.

The polyolefin resin layer 3 is not specifically limited, but preferably an unstretched (non-stretched) polyolefin resin film layer. The polyolefin resin 3 is not particularly limited, but examples thereof include an ethylene-propylene random copolymer resin and an ethylene-propylene block copolymer resin.

Among other things, it is preferably configured by a nonstretched film of a three-layer laminate consisting of a random copolymer containing a copolymerization component (olefin) other than propylene and propylene as a copolymer component/a block copolymer containing a copolymerization component (olefin) other than propylene and propylene as a copolymerization component/a random copolymer containing a copolymerization component (olefin) other than propylene and propylene as a copolymerization component. Further, as the polyolefin resin layer 3, it is especially preferable to be configured by an unstretched film composed of three layer laminate consisting of an ethylene-propylene random copolymer resin/an ethylene-propylene block copolymer resin/an ethylene-propylene random copolymer resin. As described above, the polyolefin resin layer 3 may be a single layer or multiple layers.

The thickness of the polyolefin resin layer 3 is preferably set to 10 μm to 30 μm. Among other things, the thickness is more preferable to set to 15 μm to 30 μm.

The first adhesive layer 5 is not particularly limited, but examples thereof include a polyurethane adhesive layer, a polyester polyurethane adhesive layer, a polyether polyurethane adhesive layer, an acrylic adhesive layer, etc. The thickness of the first adhesive layer 5 is preferably set to 1 μm to 5 μm. Among other things, from the viewpoint of thinning and weight saving of the packaging material, the thickness of the first adhesive layer 5 is particularly preferably set to 1 μm to 3 μm.

The second adhesive layer 6 is not particularly limited. For example, one exemplified as the first adhesive layer 5 can be used, but it is preferable to use an acid-modified polyolefin-based adhesive having less swelling due to electrolyte (it is preferred to use multifunctional isocyanate as a curing agent). The thickness of the second adhesive layer 6 is preferably set to 1 μm to 5 μm. Among other things, from the viewpoint of thinning and weight saving of the packaging material, the thickness of the second adhesive layer 6 is particularly preferably set to 1 μm to 3 μm.

The thickness (total thickness) of the packaging material 1 for a power storage device is set to 90 μm or less for thinning. Among other things, the thickness of the packaging material 1 for a power storage device is preferably set to 40 μm to 90 μm, particularly preferably set to 45 μm to 80 μm.

By forming (bulging, stretch forming, etc.) the packaging material 1 for a power storage device of the present invention, a formed case (a battery case, etc.) can be obtained. The packaging material 1 of the present invention can be used as it is without being subjected to forming.

Figure 2:
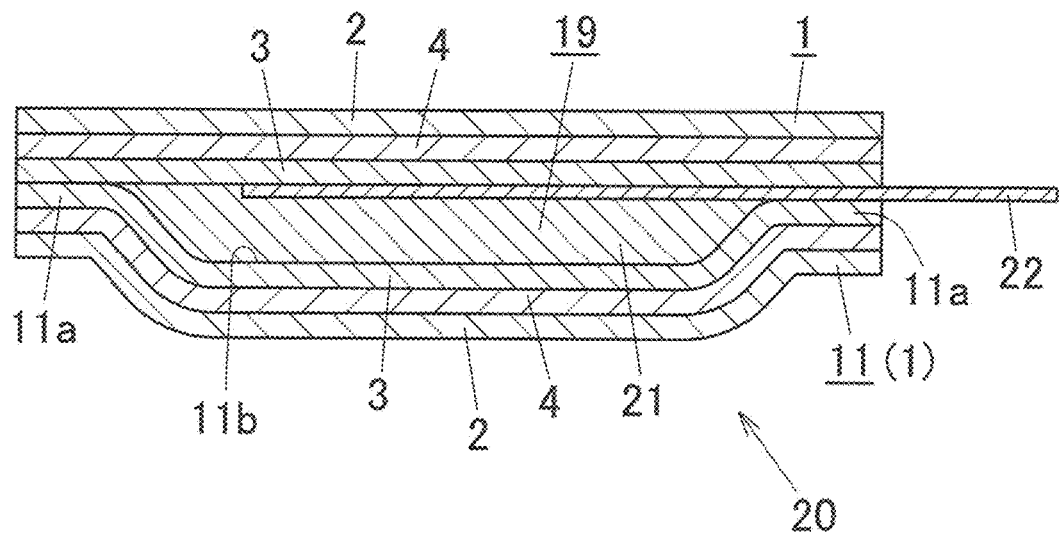
FIG. 2 is a cross-sectional view showing one embodiment of a power storage device configured using the packaging material for a power storage device according to the present invention.

An embodiment of the power storage device 20 configured using the packaging material 1 for power storage device of the present invention is shown in FIG. 2. The power storage device 20 is a lithium-ion secondary battery.

The battery 20 includes an electrolyte 21, a tab lead 22, a planar packaging material 1 not subjected to shaping, and a shaped case 11 having an accommodation recess 11b obtained by shaping the packaging material 1 (see FIG. 2). The power storage device main body 19 is configured by the electrolyte 21 and the tab lead 22.

The electrolyte 21 and a part of the tab lead 22 are accommodated in the accommodation recess 11b of the shaped case 11, the planar packaging material 1 is disposed on the shaped case 11, and (the inner layer 3 of) the peripheral portion of the packaging material 1 and (the inner layer 3) of the sealing peripheral edge portion 11a of the shaped case 11 are joined and sealed. Thus, the battery 20 is configured. The tip end portion of the tab lead 22 is led out to the outside (see FIG. 2).

EXAMPLES

Next, specific examples of the present invention will be described, but the present invention is not particularly limited to these examples.

Example 1

A chemical conversion treatment solution comprising a phosphoric acid, a polyacrylic acid (acryl-based resin), a chromium (III) salt compound, water, and alcohol was applied on both surfaces of an aluminum foil 4 having a thickness of 25 μm (A8021 annealed aluminum foil specified in JIS H4160), and then dried at 180° C. Thus, a chemical conversion coating was formed. The chromium adhesion amount of this chemical conversion coating was 10 mg/m$^2$ per one side.

Next, on one surface of the chemical conversion treated aluminum foil 4, a simultaneous biaxially stretched 6 nylon film (outer layer) 2 having a thickness of 25 μm obtained by stretching by a simultaneous biaxial stretching method was dry laminated (adhered) via a two-part curing type polyester urethane based adhesive (main agent: polyester polyurethane resin, curing agent: multifunctional isocyanate) 5. The hot water shrinkage percentage of the simultaneous biaxially stretched 6 nylon film in the M direction was 4.3%. In the simultaneous biaxially stretched 6 nylon film, the ratio (MD/TD) of the "hot water shrinkage percentage in the M direction" to the "hot water shrinkage percentage in the T direction" was 1.0.

Next, co-extrusion using a T-die was performed so that a first resin layer made of an ethylene-propylene random copolymer having a thickness of 4 μm, a second resin layer made of an ethylene-propylene block copolymer resin having a thickness of 17 μm, a first resin layer made of an ethylene-propylene random copolymer having a thickness of 4 μm, are laminated in three layers in this order, and a sealant film (first resin layer/second resin layer/first resin layer) 3 formed by laminating these three layers having a thickness of 25 μm was obtained. Thereafter, a first resin layer surface of the sealant film (inner layer) 3 was overlapped on the other surface of the aluminum foil 4 after the dry lamination via a two-part curing type adhesive maleic acid-modified polypropylene adhesive (curing agent was multifunctional isocyanate) 6, and dry laminated by sandwiching between a rubber nip roll and a laminate roll heated to 100° C. and pressure-bonded, and thereafter aged (heated) at 50° C. for 5 days. Thus, a packaging material 1 for a power storage device having the structure shown in FIG. 1 and having a thickness of 81 μm was obtained.

As the two-part curing type maleic acid-modified polypropylene adhesive, using an adhesive solution in which a maleic acid-modified polypropylene (a melting point of 80° C., an acid value of 10 mgKOH/g) of 100 parts by mass as a main agent, an isocyanurate form of hexamethylene diisocyanate of 8 parts by mass as a curing agent (NCO content rate of 20 mass %), and a solvent were mixed, the adhesive solution was applied to the other surface of the aluminum foil 4 so that the coating amount of the solid content was 2 g/m$^2$, after heating and drying, it was superimposed on the surface of the first resin layer of one of the sealant films 3.

Example 2

In the same manner as in Example 1, a packaging material 1 for power storage device having the structure shown in FIG. 1 and having a thickness of 76 μm was obtained except that a 20 μm thick sealant film (3 μm thick first resin layer/14 μm thick second resin layer/3 μm thick first resin layer) was used in place of a 25 μm thick sealant film (4 μm thick first resin layer/17 μm thick second resin layer/4 μm thick first resin layer). The first resin used in Example 2 was the same resin as the first resin used in Example 1 and the second resin used in Example 2 was the same resin as the second resin used in Example 1. This also applies to each of the following Examples and Comparative Examples.

Example 3

In the same manner as in Example 1, a packaging material 1 for a power storage device having a thickness of 75 μm was obtained except that, as a simultaneous biaxially stretched 6 nylon film (outer layer), a simultaneous biaxially stretched 6 nylon film (outer layer) in which a black ink printing layer with a thickness of 2 μm was laminated on one side (on the aluminum foil layer side) and surface coat layer made of a two-part curing type polyurethane resin (12 mass % of silica having an average grain diameter of 4 μm and 8 mass % of acrylic resin beads and having an average particle size of 3 μm) were laminated on the other side was used.

Example 4

A packaging material 1 for a power storage device having a thickness of 71 μm configured shown in FIG. 1 was obtained in the same manner as in Example 2 except that an aluminum foil having a thickness of 20 μm was used instead of an aluminum foil having a thickness of 25 μm.

Comparative Example 1

In the same manner as in Example 1, a packaging material for a power storage device having a thickness of 111 μm was obtained except that a 40 μm thick sealant film was used in place of a 25 μm thick aluminum foil and a 40 μm thick sealant film (6 μm thick first resin layer/28 μm thick second resin layer/6 μm thick first resin layer) was used in place of a 25 μm thick sealant film (4 μm thick first resin layer/17 μm thick second resin layer/4 μm thick first resin layer).

Comparative Example 2

In the same manner as in Example 1, a packaging material for a power storage device having a thickness of 86 μm was obtained except that a 15 μm thick simultaneous biaxially stretched 6 nylon film (outer layer) was used instead of a 25 μm thick simultaneous biaxially stretched 6 nylon film (outer layer), a 35 μm thick aluminum foil was used instead of a 25 μm thick aluminum foil, and a 30 μm thick sealant film (6 μm thick first resin layer/18 μm thick second resin layer/6 μm thick first resin layer) was used in place of a 25 μm thick sealant film (4 μm thick first resin layer/17 μm thick second resin layer/4 μm thick first resin layer).

Comparative Example 3

A packaging material 1 for a power storage device having a thickness of 76 μm configured shown in FIG. 1 was obtained in the same manner as in Example 1 except that a simultaneous biaxially stretched 6 nylon film (outer layer) having a thickness of 15 μm was used instead of a simultaneous biaxially stretched 6 nylon film (outer layer) having a thickness of 25 μm, and an aluminum foil having a thickness of 30 μm was used instead of an aluminum foil having a thickness of 25 μm.

Comparative Example 4

A packaging material for a power storage device having a thickness of 71 μm was obtained in the same manner as in Example 1 except that a simultaneous biaxially stretched 6 nylon film (outer layer) having a thickness of 15 μm was used instead of a simultaneous biaxially stretched 6 nylon film (outer layer) having a thickness of 25 μm.

Comparative Example 5

A packaging material for a power storage device having a thickness of 66 μm was obtained in the same manner as in Example 1 except that a simultaneous biaxially stretched 6 nylon film (outer layer) having a thickness of 12 μm was used instead of a simultaneous biaxially stretched 6 nylon film (outer layer) having a thickness of 25 μm.

Various properties of the packaging material for a power storage device obtained in each of the aforementioned Examples and Comparative Examples. For each packaging material for a power storage device, according to JIS K 7127-1999 (—test method of tensile properties—Part 3: Test conditions of film and sheet), a type 2 test piece (sample width of 15 mm) was created, a tensile test was performed to create a tensile stress-strain curve (SS curve) under the conditions of a distance between grippers of 100 mm, an inter-gauge line distance of 50 mm, a tensile speed of 100 mm/min. From this SS curve, a tensile breaking strength, a tensile breaking elongation and a fracture strain energy were obtained.

The "fracture strain energy" is a fracture strain energy (energy per unit volume) obtained by calculating the area under the curve (curve from a start of tension to a breakage) in the tensile stress-strain curve diagram (SS curve diagram).

Figure 3:
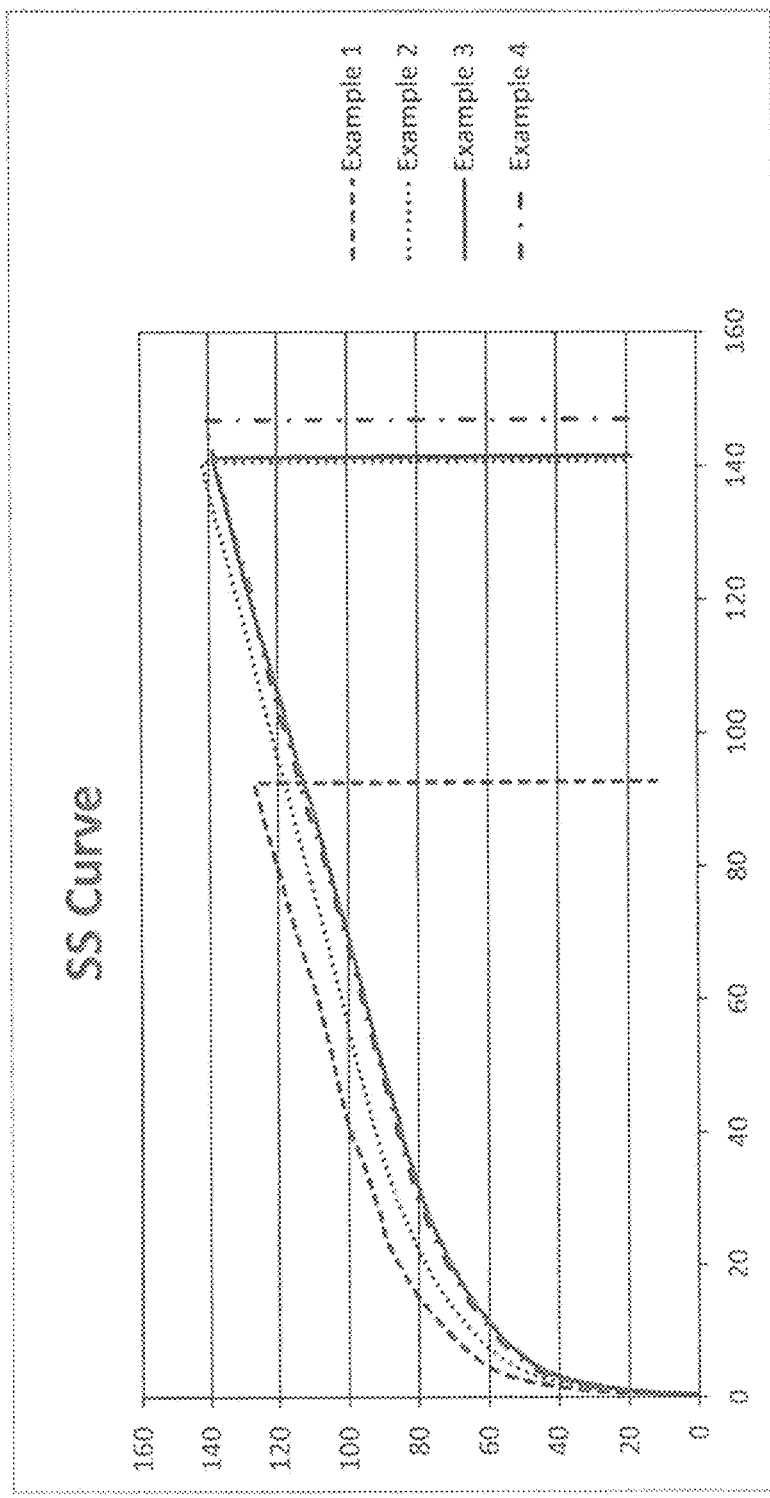
FIG. 3 is a tensile stress-strain curve diagram (SS curve) obtained by a tensile test of the packaging material for a power storage device according to Examples 1 to 4.
Figure 4:
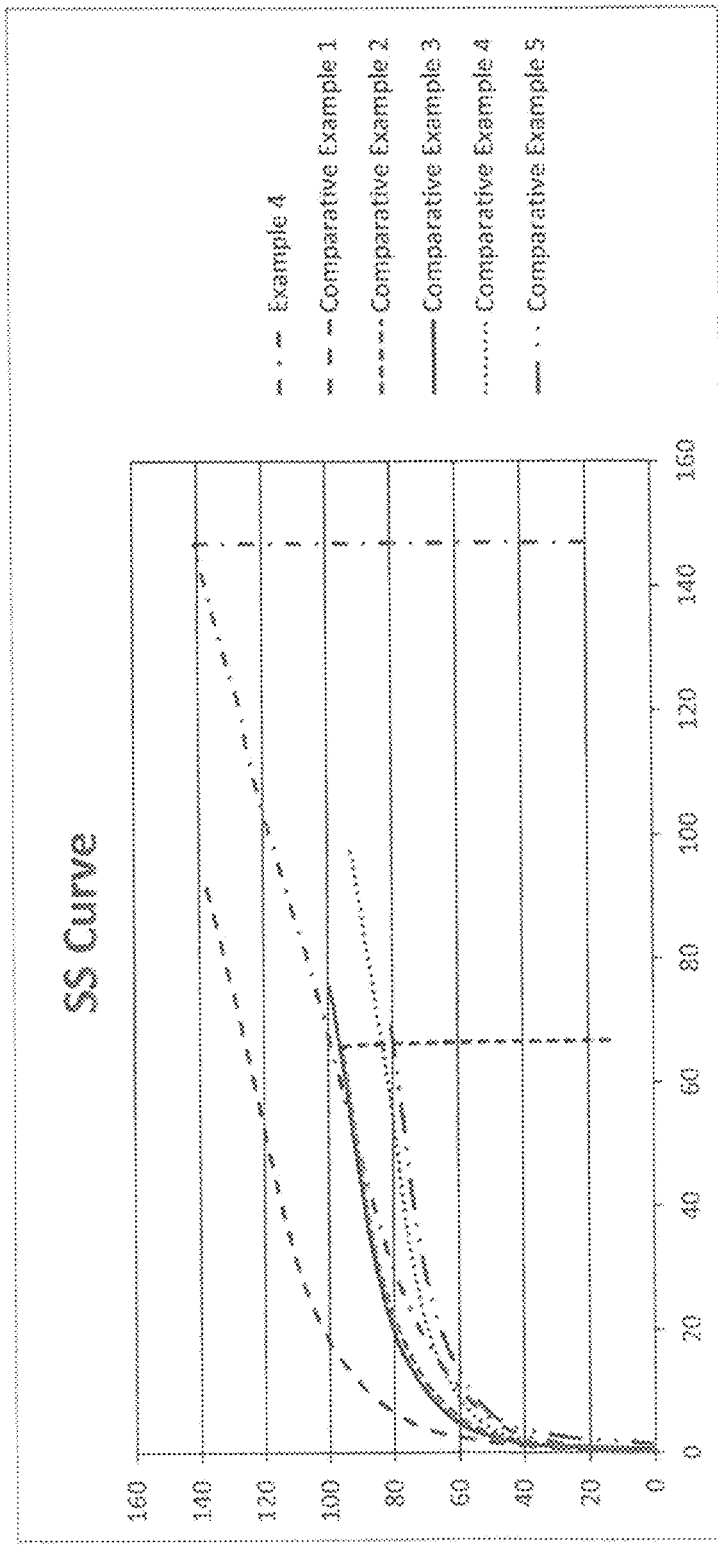
FIG. 4 is a tensile stress-strain curve diagram (SS curve) (For comparison, a tensile stress-strain curve diagram of Example 4 is also shown) obtained by a tensile test of the packaging material for a power storage device according to Comparative Examples 1 to 5.

The tensile stress-strain curve (SS curve) obtained by the tensile test of the packaging material for a power storage device of Examples 1 to 4 is shown in FIG. 3. Further, the tensile stress-strain curve (SS curve) obtained by the tensile test of the packaging material of Comparative Examples 1 to 5 is shown in FIG. 4. In these FIGS. 3 and 4, the vertical axis represents a tensile stress (unit: N/15 mm), and the horizontal axis represents a strain (elongation) (unit: %).

|  | Thickness | | | | Characteristics of packaging materials | | | | Evaluation | | | |
|---|---|---|---|---|---|---|---|---|---|---|---|---|
|  | Total thickness (μm) | Outer layer X (μm) | Al foil layer Y (μm) | Inner layer (μm) | Tensile breaking strength (N/15 mm width) | Tensile breaking elongation (%) | Ratio X/Y | Fracture strain energy (MJ/m³) | Thinness | Formability | Impact resistance | Overall Judgement |
| Ex. 1 | 81 | 25 | 25 | 25 | 123.5 | 91 | 1.00 | 75.2 | ○ | ○ | ○ | ○ |
| Ex. 2 | 76 | 25 | 25 | 20 | 143.5 | 139 | 1.00 | 129.1 | ○ | ○ | ○ | ○ |
| Ex. 3 | 75 | 25 | 20 | 20 | 138.7 | 141 | 1.25 | 131.1 | ○ | ○ | ○ | ○ |
| Ex. 4 | 71 | 25 | 20 | 20 | 140.7 | 147 | 1.25 | 139.6 | ○ | ○ | ○ | ○ |
| Comp. Ex. 1 | 111 | 25 | 40 | 40 | 138.8 | 96 | 0.63 | 64.1 | x | ○ | ○ | x |
| Com. Ex. 2 | 86 | 15 | 35 | 30 | 96.9 | 66 | 0.43 | 41.8 | ○ | x | x | x |
| Com. Ex. 3 | 76 | 15 | 30 | 25 | 99.0 | 82 | 0.50 | 60.4 | ○ | x | x | x |
| Com. Ex. 4 | 71 | 15 | 25 | 25 | 94.3 | 99 | 0.60 | 71.4 | ○ | x | x | x |
| Com. Ex. 5 | 66 | 12 | 25 | 25 | 81.2 | 74 | 0.48 | 50.9 | ○ | x | x | x |

Performance evaluation was performed on each packaging material for a power storage device obtained as described above based on the following evaluation method. The results are shown in Table 1. In Table 1, "Al foil layer" means "aluminum foil layer" (it is an abbreviation).

<Evaluation of Thinness>

A product having a thickness (total thickness) of a packaging material for a power storage device of 90 μm or less was evaluated as "○" (Pass), and one exceeding 90 μm as "x" (Failure).

<Formability Evaluation Method>

Using a bulging machine (product number: TP-25C-X2) manufactured by Amada Corporation, bulging was performed on a packaging material into a substantially rectangular parallelepiped shape of 54 mm in length and 34 mm in width, that is, bulging was performed by changing the forming depth. The presence or absence of pinholes and cracks at the corner portion of the obtained shaped body was examined, and a "maximum forming depth (mm)" in which no such pinholes and cracks were generated was investigated. It was evaluated based on the following criteria.

(Judgment Criteria)

"○" . . . the maximum forming depth was 7 mm or more
"Δ" . . . the maximum forming depth was 5 mm or more and less than 7 mm
"x" . . . the maximum forming depth is less than 5 mm.

<Impact Resistance Evaluation Method>

Two rectangular packaging materials were prepared for each Example and Comparative Example, respectively, and overlapped with the inner layer faced inward (inner side). After overlapping the two packaging materials, three sides of the periphery were heat-sealed with one side left unsealed. Next, 5 mL of electrolyte was injected from the unsealed portion into the inside, and the unsealed portion was heat-sealed in a state in which air was introduced, and the sealing was completed to obtain a simulated battery. As the electrolyte, an electrolyte in which hexafluoro phosphoric acid lithium (LiPF$_6$) was added by a concentration of 1 mol/L to a mixed solvent in which ethylene carbonate (EC), dimethyl carbonate (DMC) and ethyl methyl carbonate (EMC) were mixed in equal volumetric ratio was used. Ten simulated batteries were prepared for each Example and Comparative Example.

Next, after placing a round bar with a diameter of 15 mm on the top surface (flat surface) of the simulated battery in a stable state, a 9 kg spherical metal weight was dropped onto the round bar, and based on the following judgment criteria, the impact resistance of the packaging material was evaluated.

(Judgment Criteria)

"○" . . . Of the ten simulated batteries, 3 or less of the packaging material was broken due to falling of the weight
"Δ" . . . Of the ten simulated batteries, 4 to 7 of the packaging material was broken due to falling of the weight
"x" . . . Of the ten simulated batteries, 8 to 10 of the packaging material was broken due to falling of the weight <Overall Judgment>

When all of the evaluation results of the aforementioned thinness, formability evaluation, and impact resistance evaluation were evaluated as "○", it was evaluated as "○" (excellent). When any one of them were evaluated as "x" or "Δ", it was evaluated as "x" (not good).

As is apparent from Table 1, in the packaging materials for a power storage device of Examples 1 to 4 of the present invention, the maximum shaping depth is large although the thickness of the packaging material is as thin as 90 μm or less. Further, it is possible to secure excellent formability even when deep forming is performed and it is also excellent in impact resistance.

On the other hand, the packaging material of Comparative Example 1 in which the thickness of the packaging material was set to 111 μm is excellent in formability and impact resistance. However, the thickness of the packaging material is 111 μm and it is not possible to meet the demand for thinning. In Comparative Examples 2 to 5 which deviate from the specified range of the present invention, deep forming resulted in poor shaping and impact resistance was also insufficient.

INDUSTRIAL APPLICABILITY

The packaging material for a power storage device according to the present invention can be used as a packaging material of various power storage devices, such as, e.g., a power storage device such as a lithium secondary battery (lithium-ion battery, lithium polymer battery, etc.)
lithium-ion capacitor, and
electric double layer capacitor It should be understood that the terms and expressions used herein are used for explanation and have no intention to be used to construe in a limited manner, do not eliminate any equivalents of features shown and mentioned herein, and allow various modifications falling within the claimed scope of the present invention.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. Limitations in the claims are to be interpreted broadly based on the language employed in the claims and not limited to examples described in the present specification or during the prosecution of the application, which examples are to be construed as non-exclusive.

DESCRIPTION OF REFERENCE SYMBOLS

1 packaging material for power storage device
2 polyamide resin layer (outer layer)
3 polyolefin resin layer (inner layer)
4 aluminum foil layer
5 first adhesive layer
6 second adhesive layer
11 formed case
19 power storage device main body
20 power storage device

The invention claimed is:

1. A packaging material for a power storage device, comprising:
   a polyamide resin layer as an outer layer, wherein the polyamide resin layer includes a biaxially stretched polyamide film having
   a hot water shrinkage percentage of 2.5% to 10%,
   a tensile breaking strength of 50N/15 mm width or more, and
   a tensile breaking elongation of 70% or more,
   such that a ratio (MD/TD) of the hot water shrinkage percentage in the M direction to the hot water shrinkage percentage in the T direction is within a range of 0.8 and 1.2;
   a polyolefin resin layer as an inner layer; and
   an aluminum foil layer arranged between the outer layer and the inner layer,
   wherein a thickness of the packaging material for a power storage device is 95 μm or less,
   wherein a tensile breaking strength of the packaging material for a power storage device is 110 N/15 mm width or more, and
   wherein a tensile breaking elongation of the packaging material for a power storage device is 90% or more.

2. The packaging material for a power storage device as recited in claim 1,
   wherein when a thickness of the polyamide resin layer is "X", and a thickness of the aluminum foil layer is "Y", a relational expression of (X/Y)≥0.6 is satisfied.

3. The packaging material for a power storage device as recited in claim 1,
   wherein when a thickness of the aluminum foil layer is "Y" and a thickness of the polyolefin resin layer is "V", a relational expression of (Y/V)≥0.6 is satisfied.

4. The packaging material for a power storage device as recited in claim 1,
   wherein a thickness of the polyamide resin layer is 20 μm to 40 μm, a thickness of the aluminum foil layer is 20 μm to 25 μm, and a thickness of the polyolefin resin layer is 15 μm to 30 μm.

5. A power storage device comprising:
   a power storage device main body; and
   the packaging material for a power storage device as recited in claim 1,
   wherein the power storage device main body is packaged with the packaging material.

6. The power storage device of claim 5, further comprising a tab lead having a tip end portion outside the power storage device main body.

7. The power storage device of claim 6, wherein the power storage device main body includes an electrolyte.

* * * * *